W. S. TYLER.
FABRIC LINING FOR GRAIN CARS AND OTHER VEHICLES.
APPLICATION FILED MAY 25, 1917.
1,259,320.
Patented Mar. 12, 1918.
2 SHEETS—SHEET 1.
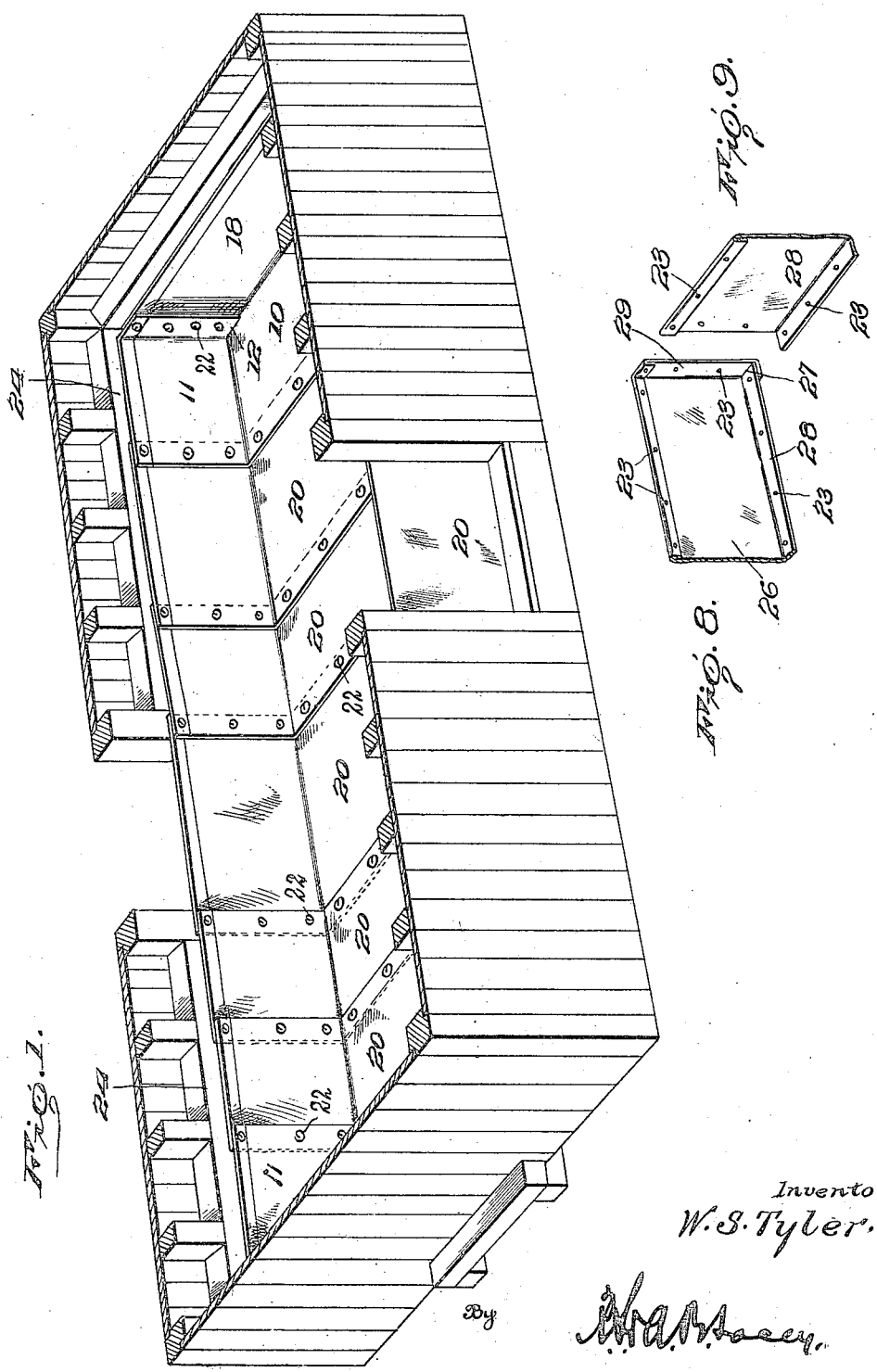
Inventor
W. S. Tyler.
By
Atty.

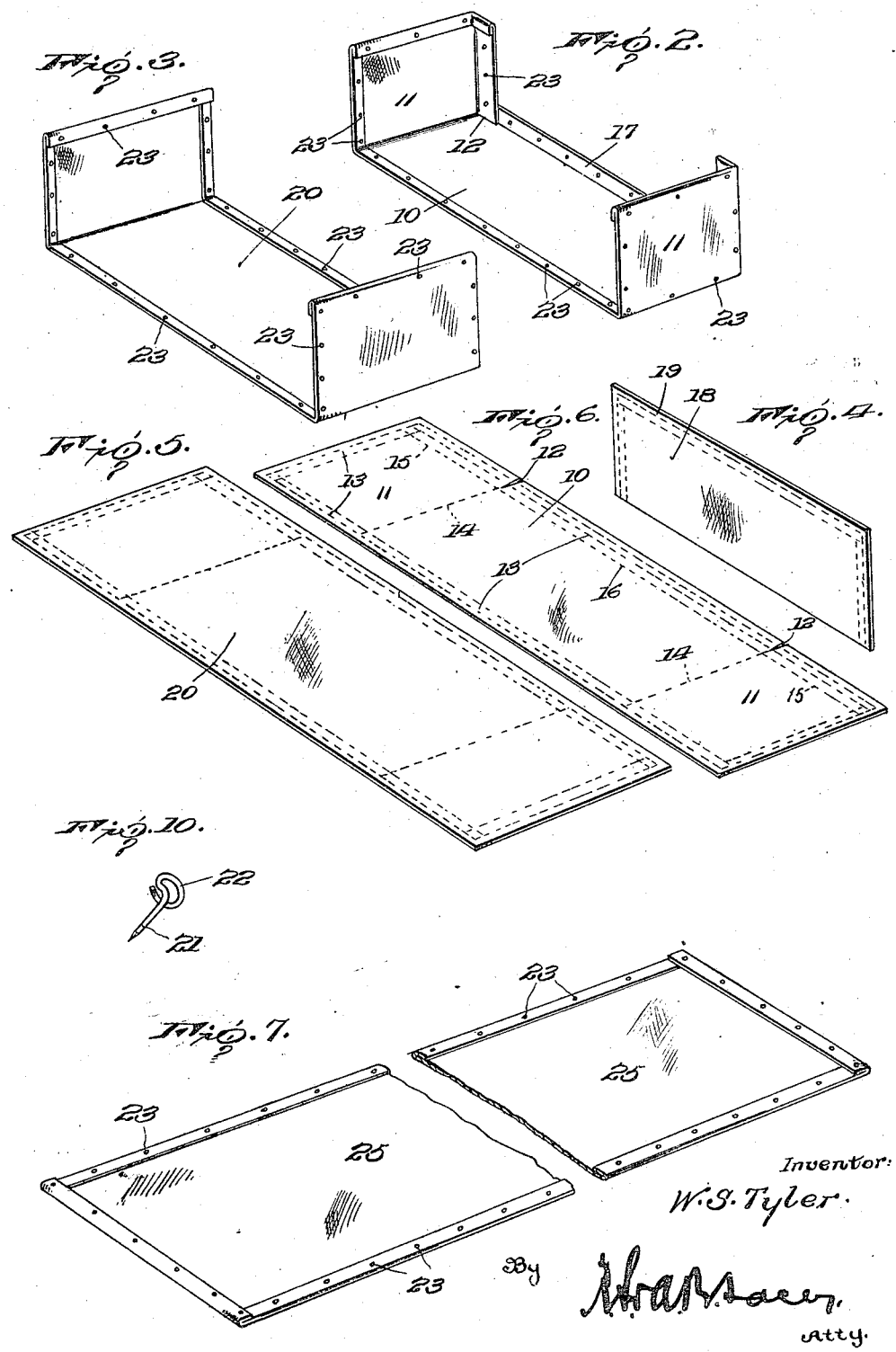

UNITED STATES PATENT OFFICE.

WILSON S. TYLER, OF KEOTA, COLORADO, ASSIGNOR OF ONE-HALF TO CHARLES O. DODDER, OF KEOTA, COLORADO.

FABRIC LINING FOR GRAIN-CARS AND OTHER VEHICLES.

1,259,320.

Specification of Letters Patent.

Patented Mar. 12, 1918.

Application filed May 25, 1917. Serial No. 170,974.

*To all whom it may concern:*

Be it known that I, WILSON S. TYLER, a citizen of the United States, residing at Keota, in the county of Weld and State of Colorado, have invented certain new and useful Improvements in Fabric Linings for Grain-Cars and other Vehicles, of which the following is a specification.

This invention relates to improvements in linings for the body portions of freight cars, wagons and the like, more particularly cars or other vehicles employed for transporting grain and like products in bulk, and has for one of its objects to provide a lining formed of overlapping sections of fabric material such as canvas, burlap or the like, and adapted to be readily secured to the inner walls of the car or other vehicle body, and likewise adapted without structural change to cars or other vehicles of varying sizes and dimensions.

With these and other objects in view, the invention consists in certain novel features of construction, as hereinafter shown and described and then specifically pointed out in the claims.

The improved device may be applied to the body portions of cars, wagons or other vehicles, but for the purpose of illustration the improved device is shown adapted for use in connection with an ordinary freight car, and in the drawings thus employed:

Figure 1 is a perspective view of the lower portion of a conventional freight or grain car with the improvement applied;

Fig. 2 is a detached perspective view of one of the lining sections employed at the ends of the car;

Fig. 3 is a perspective view of one of the lining sections employed intermediate the car, or between the end sections;

Fig. 4 is a detached perspective view of one of the lining sections which is located against the end of the car before the edges are folded and hemmed;

Fig. 5 is a perspective view of one of the intermediate sections before the edges are folded and hemmed;

Fig. 6 is a similar view of one of the terminal sections before the edges are folded and hemmed;

Figs. 7, 8 and 9 are views similar to Figs. 2 and 3, illustrating a modification in the construction.

Fig. 10 is an enlarged perspective detail illustrating the construction of the fastening devices whereby the fabric sections are secured to the supporting body.

Corresponding and like parts are referred to in the following description and indicated in all the views of the drawings by the same reference characters.

The improved lining may be constructed of any suitable fabric, such as heavy cloth, canvas, burlap or the like, and is cut in sections with the edges folded and hemmed to increase the strength of the fabric and prevent raveling or fracture when applied. The sections are arranged to extend over the bottom and up the sides of the body of the car or other vehicle, and when employed in connection with a freight car the portions of the fabric sections which bear against the sides of the car extend above the "grain line," and when employed in connection with a wagon or like vehicle the sections will extend to the upper edge of the body or box.

The terminal sections differ slightly from the intermediate sections, one of the terminal sections being illustrated in Figs. 2 and 6. Fig. 6 represents one of the terminal sections before having the edges folded and hemmed and comprises a main body portion 10 and end portions 11. At the juncture of the main portion 10 and the end portions 11 one edge of the fabric is cleft for a short distance as indicated at 12. The edges of the portions 10—11 are turned over and hemmed along the dotted lines 13 to secure the edges of the fabric and reinforce the same, and when applied to the car or other vehicle the portions 11 of the terminal sections are folded at right angles to the body portion 10 along the line 14 to cause them to assume the shape shown in Fig. 2. One edge of the portion 11 is further folded along the line 15 at right angles to the portions 11 to form "corner" guards or laps as illustrated in Figs. 1 and 2. The corresponding edge of the body portion 10 is likewise folded along the line 16 and directed at right angles to the body portion as illustrated in Fig. 2, to form a vertical guard 17 transversely of the end of the car or vehicle body and bearing against the end member of the same. Another strip of fabric material is provided comprising a body portion 18 corresponding in area to the end of the car or other vehicle with its upper edge folded over and hemmed at 19. The member 18 is arranged against the end of the vehicle with its lower edge overlapping the upturned portion 17 of the member 10 and between the corner guards of the portions 11 and the end of the vehicle, as illustrated in Fig. 1. Each end of the car or other vehicle will be provided with one of the terminal sections and one of the end members 18, and the remainder of the body of the vehicle provided with a plurality of intermediate sections, one of which is represented at 20, in Fig. 3, the number of the intermediate sections corresponding to the length of the vehicle. Ordinary grain cars are about 36 feet long and the doorway openings about 5 feet wide, and a sufficient number of the intermediate sections will be provided to fill the space between the terminal sections and the doorway openings with their edges overlapping sufficiently to prevent the escape of the grain or other product. One or more of the intermediate sections will be disposed opposite the doorway openings with the vertical portions secured to the grain doors. It is immaterial how far the edges of the sections overlap, consequently the sections are readily adjustable to the length of the car or other vehicle, and may be adjusted without structural change either in the car or in the sections.

When the sections are arranged in the car the overlapping portions are secured to each other and to the car body by suitable fastening devices one of which is represented in Fig. 10.

The fastening devices are each formed from a single section of wire and comprise a spur 21, and a substantially circular loop 22, which forms a head to the spur. Eyelets represented conventionally at 23, are formed at suitable intervals in the hemmed portions of the fabric sections, and when the sections are attached to the lining portions of the car, represented as a whole at 24, the spur portions 21 of the fastening devices are passed through the alined eyelets of the overlapping portions of the fabric sections and driven into the material of the car. The fabric sections which are disposed opposite the doorway openings are secured in the same manner by driving the spurs of the fastening devices into the material of the grain doors.

When the improved device is applied to the box or body portion of a wagon the spurs are forced into the material of the wagon body in the same manner. By this means a leak-proof lining is produced for effectually preventing the escape of any of the grain or like products while in transit, and will not interfere either with the deposit of the grain in the car or other vehicle or its discharge therefrom. After the load has been discharged from the car or other vehicle the linings are detached by withdrawing the fastening devices and rolling the detached sections into relatively small space for return to the shipping point to be again used. By this means the same linings may be repeatedly used.

In Figs. 7, 8 and 9 a modification of the arrangement of the sections is shown, consisting in providing the main body portion 25 represented in Fig. 7, of sufficient length and width to cover the entire bottom of the car or other vehicle, and then providing a plurality of sections 26 to bear against the vertical sides of the car with clefts 27 whereby their lower edges 28, may be directed at right angles to the vertical portion 26 to bear beneath the edges of the member 25 at the sides, and likewise directed at right angles to the body portion at the ends as shown at 29, corresponding to the end guard portions shown in Figs. 1 and 2. In the modified structure end sections 28 are provided corresponding to the end sections 18 with their lower edges directed at right angles to the body portions to bear beneath the ends of the floor section 25. The portion 25 is hemmed at the edges as shown in Fig. 7, and the hemmed portion provided with a plurality of the eyelets 23 to receive the spur portions 21 of the fastening devices, while the guard portions 28 and 29 are likewise provided with the eyelets for the same purpose.

The modified structure may be found advantageous under certain circumstances, but does not constitute a departure from the principle of the invention or sacrifice any of its advantages.

Any suitable fabric may be employed for the sections, but generally a light quality of canvas will be used.

Having thus described the invention, what is claimed as new is:

1. A lining of the class described comprising sections of flexible material having clefts in one edge in spaced relation, the material of the sections in advance of the clefts being folded in angular relation thereto and overlapping to form corner guards, intermediate sections overlapping the corner guard portions, end sections overlapping the corner guard portions and the adjacent portions of the intermediate sections, and fastening devices extending through the overlapping portions of the fabric sections adapted to enter a supporting structure.

2. A lining of the class described comprising sections of flexible material hemmed at the edges and with eyelets in the hemmed portions and having clefts in one edge in spaced relation, the material of the sections in advance of the clefts being folded in angular relation thereto and overlapping to form corner guards, intermediate sections having the edges hemmed with eyelets in the hemmed portions and overlapping guard portions, the sections having the hemmed portions overlapping the corner guard portions and the adjacent portions of the intermediate sections, the eyelets of the various sections registering when the same are arranged in position, and fastening devices extending through the registering eyelets and adapted to enter a supporting structure.

3. A lining of the class described comprising sections of flexible material overlapping to form corner guards, intermediate sections overlapping the corner guard portions, end sections overlapping the corner guard portions and the adjacent portions of the intermediate sections, and fastening devices extending through the overlapping portions of the fabric sections and adapted to enter a supporting structure.

In testimony whereof I affix my signature.

WILSON S. TYLER. [L. S.]

Copies of this patent may be obtained for five cents each, by addressing the "Commissioner of Patents, Washington, D. C."